Figure 1:
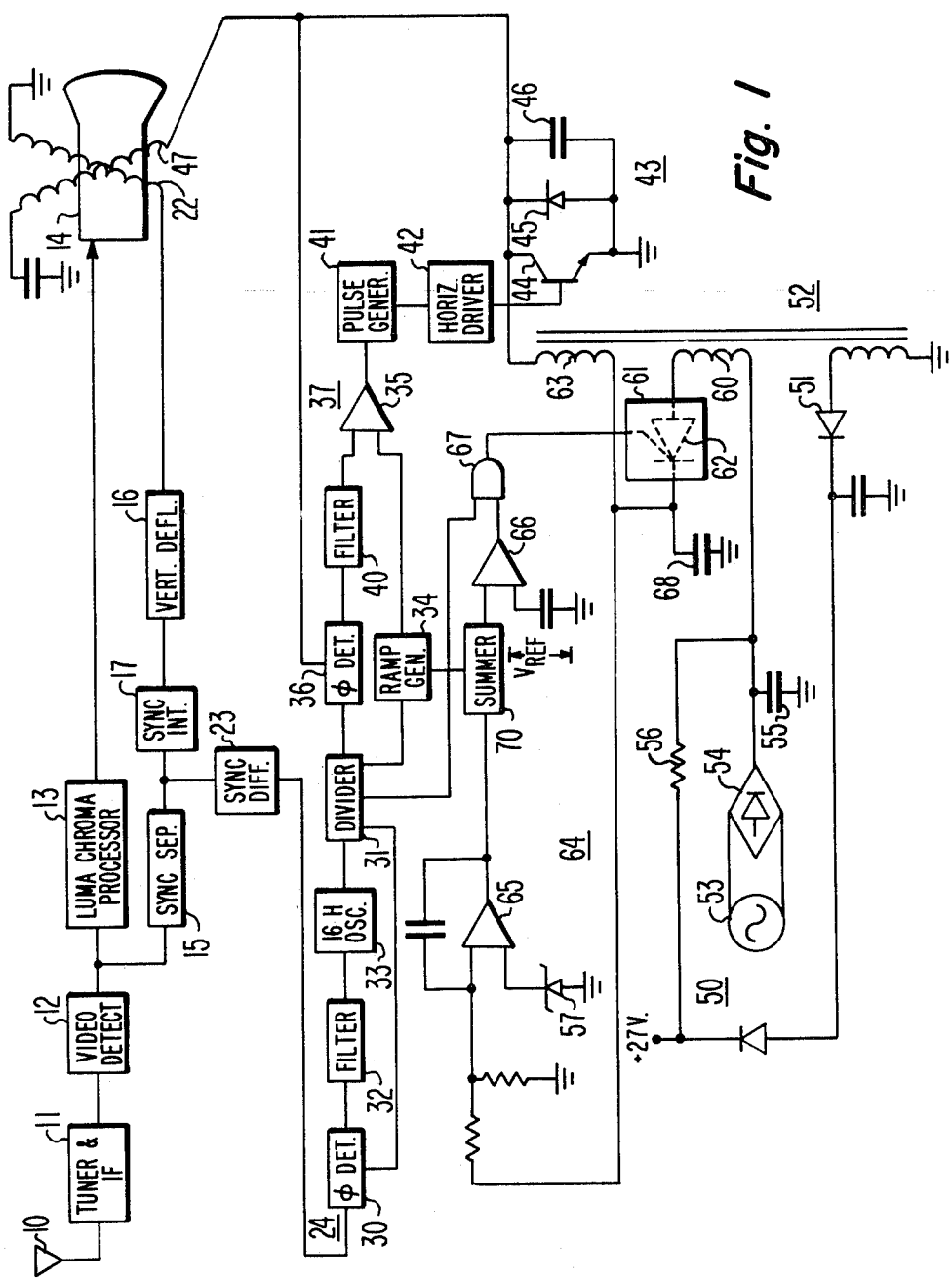

United States Patent [19]

Fernsler et al.

[11] 4,396,873
[45] Aug. 2, 1983

[54] SCR REGULATOR CONTROL CIRCUIT

[75] Inventors: Ronald E. Fernsler, Indianapolis, Ind.; Steven A. Steckler, Clark; Alvin R. Balaban, Lebanon, both of N.J.

[73] Assignee: RCA Corporation, New York, N.Y.

[21] Appl. No.: 233,487

[22] Filed: Feb. 11, 1981

[51] Int. Cl.³ .............................................. H01J 29/70
[52] U.S. Cl. ..................................... 315/411; 358/190
[58] Field of Search ................. 315/411, 408; 358/190

[56] References Cited
U.S. PATENT DOCUMENTS

| | | | |
|---|---|---|---|
| 3,688,154 | 8/1972 | Christopher | 315/27 TD |
| 3,876,910 | 4/1975 | Kraus | 317/31 |
| 3,891,892 | 6/1975 | Bohringer | 315/411 |
| 3,898,525 | 8/1975 | Steckler | 315/411 |
| 3,970,780 | 7/1976 | Minoura | 315/411 |
| 4,188,568 | 2/1980 | Manners | 315/411 |

*Primary Examiner*—Theodore M. Blum
*Attorney, Agent, or Firm*—Eugene M. Whitacre; Paul J. Rasmussen; Scott J. Stevens

[57] ABSTRACT

A switching voltage regulator control circuit incorporating a switching device including a control electrode comprises means for sampling the output voltage of the regulator. A horizontal rate signal is combined with the sampled output voltage to provide a horizontal rate sample signal. The sample signal is compared to a predetermined reference and provides a control signal for the switching device which is applied to one input of a gating means. A second horizontal rate signal is applied to a second input of the gating means and disables it during a portion of each horizontal deflection interval.

7 Claims, 2 Drawing Figures

SCR REGULATOR CONTROL CIRCUIT

This invention relates to switching voltage regulators for television receivers.

Modern television receivers, especially those which use digital or integrated circuit technology, require accurately regulated power supplies to operate the various receiver circuits. Failure to provide accurate voltage regulation for the power supply of an integrated circuit may cause a number of problems, ranging from improper operation to burn-out of the device. Lack of regulation of the deflection circuit voltages may result, for example, in raster jitter, improper centering or excessive generation of radiation.

Some receivers, including RCA Chassis No. CTC-108, provide regulation of B+ voltage from the rectified ac line voltage. This regulated B+ voltage is then used to derive other circuit voltage supplies which will in turn be regulated since they are derived from a regulated voltage. Regulators of this type may include an SCR which is gated on for particular time intervals at the horizontal rate in order to produce a regulated voltage at its output which is applied to other receiver circuits, including the horizontal deflection output circuit. When the receiver is turned on, however, the SCR will attempt to conduct for the entire horizontal interval since the SCR output or cathode voltage is low with respect to the desired regulated voltage. Conduction of the SCR at start-up may excessively load the supply potential if the supply filter capacitor has not had sufficient time to charge. Conduction of the SCR discharges the capacitor, resulting in a drop in voltage at the anode of the SCR. This may result in the regulator circuit operating improperly. The receiver will therefore not achieve normal operation.

In accordance with the present invention, means are provided for limiting the conduction angle of the regulating circuit switching device in order to allow the ac line derived B+ supply voltage to reach a predetermined minimum value. The device connection angle limiting means is designed so as not to interfere with the normal operation of the regulator circuit.

In accordance with a particular embodiment of the present invention, in a television receiver having a switched mode voltage regulator incorporating a switching device including a control electrode, a regulator control circuit comprises means for sampling the output voltage of the regulator. Means are provided for applying the sampled voltage to a horizontal rate signal in order to provide a horizontal rate sample signal. Means for comparing the horizontal rate sample voltage with a predetermined reference level to provide a control signal for the switching device are also provided. Gating means having a first input coupled to the switching device control signal and having a second input and an output are also included. Means provide a second horizontal rate signal to the second input which disables the gating means for a portion of each horizontal deflection interval. Means couple the gating means output to the switching device control electrode to provide the control signal to the switching device control electrode when the gating means is enabled.

Figure 2:
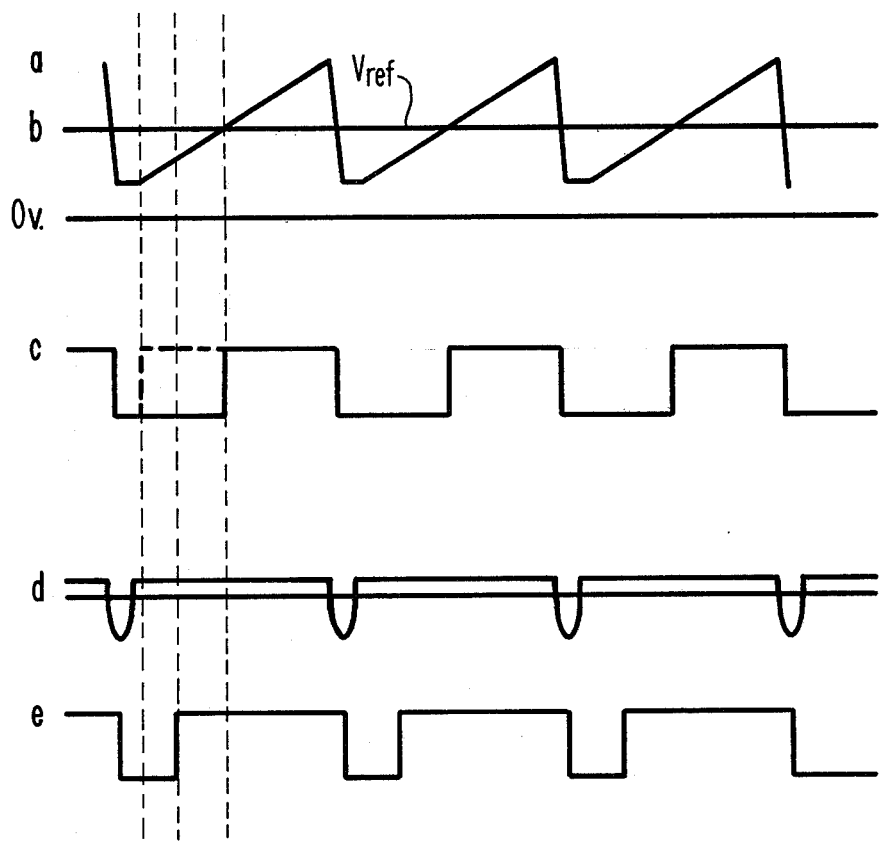

In the accompanying drawing, FIG. 1 is a block and schematic diagram of a television receiver embodying a regulator control circuit in accordance with the present invention; and FIG. 2 illustrates waveforms helpful in understanding the operation of the embodiment of FIG. 1.

The television receiver of FIG. 1 includes an antenna 10 which applies radio frequency signals to the tuner and intermediate frequency circuitry 11 of the receiver. I.F. signals are applied to a video detector 12, which produces a composite video signal. The video information of the composite video signal is processed by luminance and chrominance processing circuitry 13, which applies video drive signals to a kinescope 14.

The composite video signal is also supplied to a sync separator 15, which separates the horizontal and vertical sync signals from the video information. This composite sync signal is applied to a vertical deflection circuit 16 by way of a sync integrator 17. The sync integrator 17 supplies integrated vertical sync pulses to the vertical deflection circuit to establish the timing of vertical deflection waveforms which are applied to a vertical deflection winding 22 on the kinescope.

A sync differentiator 23 separates horizontal sync information from the composite sync signal and provides horizontal sync signals to the first loop 24 of a horizontal AFPC system. The horizontal sync signals are applied to one input of a first phase detector 30. The first phase detector 30 also receives an output signal at the horizontal deflection frequency from a divider 31 at a second input. The output signal resulting from a phase comparison of these two signals is filtered by a filter 32 and applied as a control signal to a 16 H oscillator 33, having a nominal frequency which is sixteen times the desired horizontal scanning frequency. The oscillator 33 produces an output signal which is applied to the divider 31.

The divider 31 divides the oscillator output signal by sixteen to produce an output signal at the fundamental horizontal frequency for the first phase detector 30.

Another output of divider 31 is coupled to the input of a ramp generator 34, the output of which is coupled to the input of a comparison circuit 35. A third divider output is coupled to one input of a second phase detector 36 of a second AFPC loop 37.

The output of the second phase detector 36 is filtered by a filter 40 and the filtered output signal is applied to a second input of comparison circuit 35. The output of the comparison circuit 35 is coupled to a pulse generator 41, the output of which supplies a fixed duration horizontal deflection drive signal to a horizontal driver circuit 42. The horizontal driver circuit 42 supplies horizontal deflection drive waveforms to a horizontal deflection output circuit 43. Output circuit 43 includes an output transistor 44 coupled in parallel with a damper diode 45 and a retrace capacitor 46. Output circuit 43 supplies deflection current to winding 47 on the kinescope 14, and develops flyback pulses for the second phase detector 36. The output of phase detector 36 is a signal representative of the time difference between the horizontal retrace pulse and the pulse from divider 31 which is locked to the incoming horizontal sync pulses.

During normal receiver operation, comparator 35 compares a recurrent horizontal rate ramp voltage from ramp generator 34, with a dc voltage from filter 40. Comparator 35 generates a trigger pulse output resulting from the intersection of the ramp and the dc voltage. The time of intersection may vary from line to line in order to maintain proper phase synchronization between the flyback pulses and the horizontal synchronizing pulses for proper horizontal centering of the scanned television raster.

The presence of trigger pulses at the input of pulse generator 41 causes pulse generator 41 to produce an output which is applied to horizontal driver circuit 42.

The receiver of FIG. 1 also incorporates an illustrative start-up circuit 50 which provides supply voltages to receiver circuitry until normal supply voltage sources are energized. Under normal operating conditions, the +27 V operating supply voltage, which supplies circuitry including the AFPC apparatus described above, is derived from a winding 51 of the high voltage transformer 52. During receiver start-up, transformer 52 cannot supply sufficient voltage to winding 51. Auxiliary supply voltage is therefore derived from the ac line. The ac line source 53 provides a voltage which is rectified by a diode bridge 54 and charges a filter capacitor 55 to develop a raw B+ voltage. This rectified B+ voltage is applied through a resistor 56 to the appropriate receiver circuits. The value of resistor 56 is chosen so that the auxiliary supply voltage is less than the normal winding 51-derived voltage, which greatly decreases the current flow through resistor 56 during normal operation. This allows the utilization of the regulated and more efficient source derived from winding 51.

The rectified ac line voltage is also applied through a winding 60 of horizontal output transformer 52 to an input of a B+ regulator circuit 61. This input signal, which comprises the horizontal rate trace and retrace voltage components superimposed on the raw B+, is shown in FIG. 2d. Regulator circuit 61 includes an SCR 62, which is shown schematically by dashed lines within the outline of circuit 61. The output of regulator circuit 61 is the regulated B+ voltage obtained across a filter capacitor 68 which, for one use, is applied through the primary winding 63 of transformer 52 to horizontal output circuit 43.

The output voltage of regulator circuit 61 is also sampled by a regulator control circuit 64. Regulator control circuit 64 comprises an error amp or comparator 65 which provides a dc voltage at the output of error amp 65, the level of which is dependent on the difference between the regulator output voltage and a reference voltage determined by zener diode 57. Error amp 65 also further smoothes any ripple in the required voltage from regulator 61. This output is combined with a horizontal rate ramp voltage from ramp generator 34 by a summing circuit 70. The summing of the ramp voltage with the integrator output results in a ramp voltage the dc voltage component of which is dependent on the error amp output voltage. This "floating" ramp voltage with the dc component, shown in FIG. 2a, is applied to one input of a comparator 66. The other input of comparator 66 is connected to a reference voltage designated as $V_{ref}$ in FIG. 1 and shown in FIG. 2b.

The output of comparator 66 is a pulse width modulated signal, shown in FIG. 2c, the width of which is determined by the time of intersection of the ramp voltage with the $V_{ref}$ voltage. During normal receiver operation, this pulse width modulated signal is applied through gate 67 to the gate or control electrode of SCR 62 of regulator circuit 61. This gating signal controls the conduction time of SCR 62 to control the regulated voltage level to the regulator driver circuits.

During receiver start-up, however, the sampled voltage at the output of regulator 61 will be much lower than the desired regulated voltage. This will result in waveform 2c being higher for a greater duration (as shown by dashed lines) in an attempt to turn on SCR 62 for a greater length of time. If capacitor 55 is not sufficiently charged, however, conduction of SCR 62 in an attempt to power the receiver circuits, in particular the horizontal output circuit, will load the ac supply, discharging capacitor 55 below its normal operating voltage. The regulator 61 and therefore the regulator driven receiver circuits will fail to operate properly.

In accordance with one aspect of the present invention, regular control circuit 64 also incorporates a gating means 67 which limits the conduction angle of SCR 62 to permit normal receiver start-up. Gate 67 receives one input from the output of comparator 66. Another input of gate 67 is derived from divider 31, which operates as a digital counter. Divider 31 produces a fixed duration pulse, shown in FIG. 2e, which disables gate 67 during a portion of each horizontal deflection interval. A comparison of the gate disable pulse of FIG. 2e with the horizontal rate regulator input signal in FIG. 2d shows that SCR 62 is disabled for approximately 25% of each horizontal deflection interval. This provides sufficient opportunity to establish adequate supply voltage across capacitor 55 to sustain SCR 62 conduction during start-up. The remaining 75% of the horizontal interval where SCR gating can occur provides sufficient regulating range during normal receiver operation.

The logic implementation and signal polarities shown are merely illustrative of one particular embodiment and any logic arrangement providing the timing of the waveforms of FIG. 2c may be utilized.

The regulator control circuit of the present invention utilizes digitally generated timing and control signals which occur at fixed preselected intervals and are therefore not subject to timing variations which may occur with analog timing circuits. This arrangement largely uses existing circuitry, resulting in a more cost effective and less complex regulator control circuit than would be possible with the use of analog timing circuits.

We claim:
1. In a television receiver having a switched mode voltage regulator coupled to a source of input voltage, said regulator incorporating a switching device including a control electrode, a regulator control circuit comprises:
    means for sampling the output voltage of said regulator;
    a first source of horizontal rate signals;
    means for combining the regulator sample signal and said horizontal rate signal to provide a horizontal rate sample signal;
    means for comparing said horizontal rate sample signal with a predetermined reference level, for providing a control signal for causing conduction of said switching device;
    gating means, having a first input coupled to said comparing means for enabling said gating means with said control signal and having a second input and an output;
    means for providing a second horizontal rate signal coupled to said second input, said horizontal rate signal disabling said gating means for a portion of each horizontal deflection interval even in the presence of said control signal for limiting the conduction of said switching device; and
    means coupling said gating means output to said switching device control electrode for providing said control signal to said switching device control electrode when said gating means is enabled.

2. The arrangement as defined in claim 1, wherein said switching device comprises an SCR.

3. The arrangement as defined in claim 1, wherein said means for providing a second horizontal rate signal comprises a digital counter.

4. The arrangement as defined in claim 1, wherein said second horizontal rate signal disables said gating means for a predetermined interval at the beginning of each horizontal deflection interval.

5. In a television receiver having a switched mode voltage regulator coupled to a source of input voltage and a load, said input voltage increasing from substantially zero upon receiver turn-on, said regulator incorporating a switching device including a control electrode, a regulator control circuit which limits the loading of said load on said input voltage source comprises:
   means for sampling the output voltage of said regulator;
   a first source of horizontal rate signals;
   means for combining the regulator sample signal and said horizontal rate signal to provide a horizontal rate sample signal;
   means for comparing said horizontal rate sample signal with a predetermined reference level, to provide a control signal for said switching device;
   digital counting means synchronized with a horizontal rate reference signal for providing a plurality of signal pulses timed in relation to said horizontal rate reference signal; and
   means coupled to said digital counting means and to said comparing means for applying said control signal to said switching device control electrode, said means being disabled in the presence of said signal pulses.

6. The arrangement defined in claim 5, wherein respective ones of said signal pulses occur at the beginning of each horizontal deflection interval.

7. In a television receiver having a switched mode voltage regulator coupled to a source of input voltage, said regulator incorporating a switching device including a control electrode, a regulator control circuit comprises:
   means for sampling the output of said regulator;
   a first source of horizontal rate signals;
   means for combining said sample voltage and said horizontal rate signal to provide a horizontal rate sample signal;
   means for comparing said horizontal rate sample signal with a predetermined reference level, to provide a control signal for said switching device; and
   means for preventing the generation of said control signal independent of said output voltage of said regulator for a predetermined portion of each horizontal deflection interval for limiting the conduction of said switching device.

* * * * *

UNITED STATES PATENT AND TRADEMARK OFFICE
CERTIFICATE OF CORRECTION

PATENT NO. : 4,396,873

DATED : August 2, 1983

INVENTOR(S) : Ronald E. Fernsler et al.

It is certified that error appears in the above-identified patent and that said Letters Patent is hereby corrected as shown below:

Column 1, line 41, delete "connection" and insert -- conduction --. Column 2, line 66, delete "synchronization" and insert -- synchronism --. Column 3, line 46, delete "required" and insert -- regulated --. Column 4, line 11, delete "regular" and insert -- regulator --. Column 6, line 16, after "output" insert -- voltage --.

Signed and Sealed this

Eighteenth Day of December 1984

[SEAL]

Attest:

GERALD J. MOSSINGHOFF

Attesting Officer

Commissioner of Patents and Trademarks